A. W. PEARSALL.
TUBE COUPLING FOR PNEUMATIC DESPATCH SYSTEMS AND THE LIKE.
APPLICATION FILED FEB. 17, 1919.

1,357,894.

Patented Nov. 2, 1920.

Inventor
Albert W. Pearsall
by Roberts Roberts & Cushman
his Attorneys

UNITED STATES PATENT OFFICE.

ALBERT W. PEARSALL, OF LOWELL, MASSACHUSETTS, ASSIGNOR TO THE LAMSON COMPANY, OF BOSTON, MASSACHUSETTS, A CORPORATION OF NEW JERSEY.

TUBE-COUPLING FOR PNEUMATIC-DESPATCH SYSTEMS AND THE LIKE.

1,357,894. Specification of Letters Patent. Patented Nov. 2, 1920.

Application filed February 17, 1919. Serial No. 277,641.

*To all whom it may concern:*

Be it known that I, ALBERT W. PEARSALL, a citizen of the United States of America, and resident of Lowell, in the county of Middlesex and State of Massachusetts, have invented new and useful Improvements in Tube-Couplings for Pneumatic-Despatch Systems and the like, of which the following is a specification.

The present invention relates to pipe couplings and more particularly to couplings for connecting together the tubes in a pneumatic despatch system of the type adapted to convey cash boxes or other articles.

In systems of the aforesaid character many peculiar difficulties are presented. The tubes are made of thin metal, usually either brass or aluminum, and are therefore not adapted to be clamped very tightly or to have screws or other fastening means secured therein. This is particularly true when the tubes are made of aluminum; and moreover aluminum is not adapted to be soldered or welded. Furthermore, in installing such systems it is usually necessary to cut the tubes at the place where the system is installed, in order to fit the system into the peculiar circumstances of the place, and it is therefore impracticable to form flanges or the like at the ends of the tubes when they are manufactured. Pneumatic systems should be substantially air-tight in order to prevent the leakage of air, into the system in case of a vacuum system and out of the system in the case of a pressure system. Furthermore there are several factors peculiar to systems of the character referred to which tend to separate the tube sections. The carriers passing through the system rub and strike against the walls of the tubes tending to loosen and separate them. Where a joint is followed by a bend in the tubing the joint is especially liable to loosening due to the impact of the carriers against the bend. If the tubes do not match accurately at their abutting ends the carriers strike against the edges of the tubes and not only tend to cut the carrier runners but also tend to separate the tubes.

Another problem presented by pneumatic despatch systems is the elimination of the noise produced by the carriers passing through the tubes. The carriers are usually encircled with bands of felt or the like at their ends to reduce the noise and this is usually satisfactory where the tubes are smooth and continuous on the inside. However, if there are annular recesses on the inner periphery of the tubing, as e. g., where the juxtaposed ends of two adjoining tubes have separated a small amount, the carrier strikes the forward shoulder thus presented by the recess and, even where the carriers are fitted with felt heads and sealing disks behind the felt heads or the like, the impact produces an objectionable noise. Indeed, the felt heads or runners fitted with the sealing disks expand into the annular recesses and accentuate the noise. And this action obviously tends unduly to wear the carriers and further to separate the tubes. Similar effects result from any annular recesses on the inner periphery of the tubing, as e. g., the recesses formed by striking up annular beads near the ends of the tubes to coöperate with the couplings employed to hold the tubes together.

The objects of the present invention are to overcome the aforesaid difficulties and more particularly to provide a coupling which is particularly adapted to light tubing of aluminum or other material, which will prevent the tubes from separating even under severe conditions of usage, which is relatively noiseless, which is air-tight, which can be easily and quickly applied even by unskilled workmen, which permits a section of the tubing to be removed without disturbing adjacent sections, and which affords other advantages as will hereinafter appear.

In the accompanying drawings which illustrate two preferred embodiments of my invention,—

Figure 1:
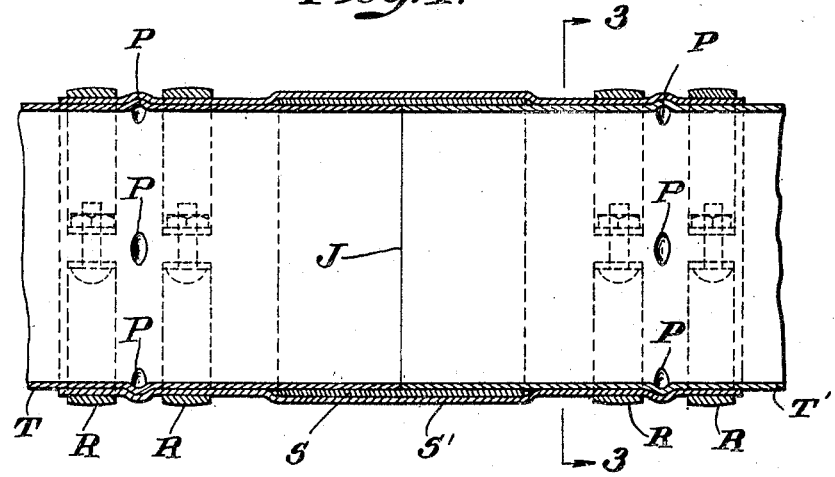
Figure 1 is a central longitudinal section of one embodiment of the invention.

The particular embodiment of the invention illustrated in Fig. 1 comprises an inner sleeve S surrounding the juxtaposed ends of the two tubes T and T', an outer sleeve S' surrounding the inner sleeve S and extending beyond the sleeve S in both directions, and a plurality of clamping rings R for securing the ends of the outer sleeve S' to the tubes T and T' respectively, the rings being divided and having bolts B for drawing the ends together. The tubes T and T' are provided with annular rows of protuberances P on their outer peripheries to coöperate with the clamping rings to secure the ends of the sleeve S' to the tubes.

The sleeve S is preferably continuous circumferentially in which case it is placed over the tubes by slipping it over the end of one tube and then slipping the other tube thereinto so that the two tubes abut in the central transverse region of the tube. The sleeve S, which preferably fits snugly around the ends of the tubes, may be formed of the same material as the tubes, e. g., brass or aluminum, or of any other suitable material.

Figure 3:
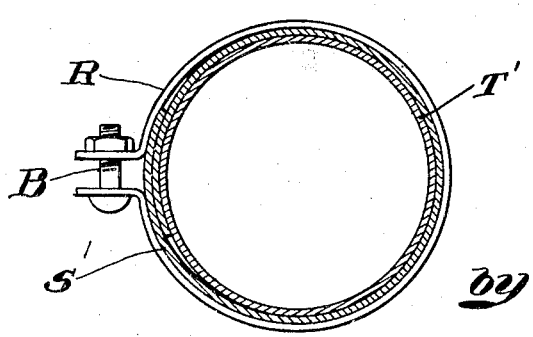
Fig. 3 is a transverse section on the line 3—3 of Fig. 1.

The sleeve S' is formed of a sheet of material and is wound around the tubes after the sleeve S has been fitted upon the tubes, the ends of the sheet preferably overlapping as shown in Fig. 3. The sheet of material of which the sleeve S' is formed is preferably thin and flexible so that it may be readily pressed inwardly around the tubes T and T' at the ends of the sleeve S and on either side of the rows of protuberances P, suitable material being thin sheet tin.

The protuberances P on the outer periphery of the tubes T and T' are preferably formed by striking up indentations in the tubes. For a purpose which will hereinafter be explained the area of the indentations is relatively small and the indentations are spaced apart. The indentations are preferably made at the time the tubes are fitted together, after the tubes have been cut to the proper length, but may readily be made in tubes already installed without removing the tubes from their supports. The indentations may readily be formed by means of a pincer-like tool which has two arms pivoted together, one arm extending inside the tube and one arm extending outside the tube and the tool being provided with a stop adapted to engage the end of the tube so that when the two arms are forced together an indentation will be formed at a predetermined distance from the end of the tube.

Figure 2:
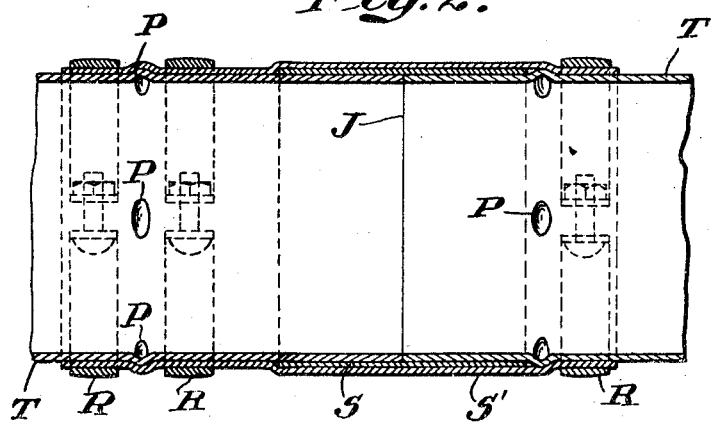
Fig. 2 is a central longitudinal section of the other embodiment.

The embodiment illustrated in Fig. 2 is similar to that shown in Fig. 1 in that it comprises an inner sleeve S, and outer sleeve S', and clamping rings R for connecting the two tubes T and T' together, the tubes being provided with protuberances P as in Fig. 1. However at the right-hand end the protuberances P are located at the end of the sleeve S and only a single clamp ring is employed at that end of the sleeve, the parts being so arranged that the protuberances restrict the endwise movement along the tubes of both the inner and outer sleeves.

By means of my improved coupling the light tubing of phenumatic despatch systems may be readily and durably secured together. With the double sleeve arrangement the inner sleeve functions principally to aline the connection and render it air-tight while the outer sleeve serves principally to secure the two tube sections together. By virtue of the protuberances P the tubes are prevented from pulling apart without clamping the sleeve S sufficiently tightly to deform the thin tubes and without soldering or welding the sleeve to the tubes.

A cardinal feature of the invention resides in the unique formation of the raised portions P which are annularly arranged around the tubes T and T'. If these raised portions were made continuous in the form of an annular bead, an annular channel would result on the inside of the tube. As hereinbefore explained this would cause the tubes to tend to separate and would result in excessive noise and loss of transmission force at the several joints. However, by making the area of the indentations P relatively small and by spacing the indentations apart a considerable distance all of these faults are overcome.

Another important feature of the invention in its more specific aspect resides in locating the indentations or protuberances P a sufficient distance from the end of the tube at least on one side of the joint, to permit the closed ring or sleeve S to be slipped along the tube past the joint between the two tubes. In this way a tube section may be taken out or inserted without disturbing the adjoining tube sections. In Fig. 1 the sleeve S may be slipped from over the joint J in either direction.

I claim:

1. A coupling for connecting together the juxtaposed ends of two tubes comprising raised portions annularly arranged on the outer peripheries of said ends, and a sheet of material wound around said ends, the ends of said sheet being drawn down outside said raised portions and secured to said tubes respectively.

2. A coupling for connecting together the juxtaposed ends of two tubes comprising raised portions annularly arranged on the outer peripheries of said ends, a sheet of material wound around said ends, and clamps for drawing said sheets inwardly around said tubes adjacent said raised portions.

3. A coupling for connecting together the juxtaposed ends of pneumatic tubes or the like comprising a plurality of protuberances spaced around the outer periphery of each of said ends, said protuberances comprising indentations struck up from the tubes, and a sheet of material wound around said ends, the end of said sheet being drawn down outside said protuberances and secured to said tubes respectively.

4. A coupling for connecting together the juxtaposed ends of two tubes comprising a sleeve closely surrounding said ends, a sheet of material wound around said ends over said sleeve, the end of said sheet extending beyond the ends of said sleeve, and means for securing the ends of said sheet to said tubes respectively.

5. A coupling for connecting together the juxtaposed ends of two tubes comprising raised portions annularly arranged on the outer peripheries of said tubes, a sleeve closely surrounding said ends and extending outwardly to said raised portions, and a sheet of material wound around said sleeve and extending over said raised portions, said sheet being drawn down outside said raised portions and secured to said tubes respectively, whereby said raised portions restrict the movement of both said sleeve and said sheet longitudinally of the tube.

6. The method of joining together the ends of two pneumatic tubes or the like comprising striking up adjacent the ends of the tubes raised portions annularly arranged, placing a sleeve over said ends of the tubes, and clamping the sleeve to the tubes outside said raised portions.

7. The method of joining together the ends of two pneumatic tubes or the like comprising striking up an annular row of protuberances adjacent the end of each tube, placing a sleeve over said ends of the tubes, and clamping the sleeve to said tubes outside said rows of protuberances.

8. The method of joining together the ends of two pneumatic tubes or the like comprising striking up an annular row of protuberances adjacent the end of each tube, wrapping a sheet of material around said ends, and clamping said sheet to said tubes outside said protuberances.

9. The method of joining together the ends of two pneumatic tubes or the like comprising striking up an annular row of protuberances adjacent the end of each tube, fitting a continuous sleeve over said ends between said rows of protuberances, wrapping a sheet of material around said sleeve over said protuberances, and clamping said sheet to said tubes outside said protuberances.

10. A coupling for connecting together the juxtaposed ends of two tubes comprising raised portions annularly arranged on the outer peripheries of said tubes at different distances from said ends respectively, a sleeve closely surrounding said ends and extending outwardly to the said raised portions on one of said tubes, the other of said raised portions being displaced from the end of the other tube a sufficient distance to permit said sleeve to be moved along the other tube beyond the joint between the two tubes, a sheet of material wound around said sleeve and extending over said raised portions, and means for securing said sleeve to said tubes in the regions of said raised portions.

11. A coupling for connecting together the juxtaposed ends of two tubes comprising raised portions annularly arranged on the outer peripheries of said tubes in spaced relationship to said ends, a sleeve closely surrounding said ends between said raised portions, one of said raised portions being spaced from the end of the tube a distance sufficient to permit said sleeve to be moved along the tube beyond the joint between the two tubes, and a sheet of material wound around said sleeve and secured to said tube in the regions of said raised portions.

Signed by me at Dallas, Texas, this third day of February, 1919.

ALBERT W. PEARSALL.